United States Patent
Fox et al.

(10) Patent No.: US 8,272,218 B2
(45) Date of Patent: Sep. 25, 2012

(54) SPIRAL COOLED FUEL NOZZLE

(75) Inventors: Timothy Fox, Hamilton (CA); Reinhard Schilp, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 950 days.

(21) Appl. No.: 12/236,667

(22) Filed: Sep. 24, 2008

(65) Prior Publication Data

US 2010/0071374 A1   Mar. 25, 2010

(51) Int. Cl.
*F02C 1/00* (2006.01)
*B05B 1/26* (2006.01)

(52) U.S. Cl. .............. 60/742; 60/737; 60/740; 239/500; 239/502

(58) Field of Classification Search .............. 60/740, 60/742, 744, 747; 239/132, 533.2, 500, 502
See application file for complete search history.

(56) References Cited

U.S. PATENT DOCUMENTS

| | | | |
|---|---|---|---|
| 3,172,735 A * | 3/1965 | Barclay et al. ................ 422/160 |
| 3,532,271 A | 10/1970 | Polnauer | |
| 4,092,826 A | 6/1978 | Pask | |
| 4,229,944 A | 10/1980 | Weiler | |
| 5,570,580 A | 11/1996 | Mains | |
| 6,192,688 B1 | 2/2001 | Beebe | |
| 6,247,317 B1 | 6/2001 | Kostka | |
| 6,378,787 B1 | 4/2002 | Buchi et al. | |
| 6,539,724 B2 * | 4/2003 | Cornwell et al. .............. 60/776 |
| 6,702,574 B1 | 3/2004 | Dobbeling | |
| 7,032,843 B1 * | 4/2006 | Johnson et al. ............... 239/488 |
| 7,043,922 B2 * | 5/2006 | Thompson et al. ............ 60/772 |
| 7,174,717 B2 | 2/2007 | Prociw | |
| 2007/0101727 A1 | 5/2007 | Prociw | |

* cited by examiner

*Primary Examiner* — Ehud Gartenberg
*Assistant Examiner* — Arun Goyal

(57) ABSTRACT

A fuel nozzle for delivery of fuel to a gas turbine engine. The fuel nozzle includes an outer nozzle wall and a center body located centrally within the nozzle wall. A gap is defined between an inner wall surface of the nozzle wall and an outer body surface of the center body for providing fuel flow in a longitudinal direction from an inlet end to an outlet end of the fuel nozzle. A turbulating feature is defined on at least one of the central body and the inner wall for causing at least a portion of the fuel flow in the gap to flow transverse to the longitudinal direction. The gap is effective to provide a substantially uniform temperature distribution along the nozzle wall in the circumferential direction.

17 Claims, 5 Drawing Sheets

SPIRAL COOLED FUEL NOZZLE

This invention was made with U.S. Government support under Contract Number DE-FC26-05NT42644 awarded by the U.S. Department of Energy. The U.S. Government has certain rights to this invention.

FIELD OF THE INVENTION

The present invention relates to gas turbine engines and, more particularly, to fuel nozzles for use in gas turbine engines.

BACKGROUND OF THE INVENTION

In gas turbine engines, fuel is delivered from a source of fuel to a combustion section where the fuel is mixed with air and ignited to generate hot combustion products defining working gases. The working gases are directed to a turbine section. The combustion section may comprise one or more stages, each stage supplying fuel to be ignited. It has been found that the production of $NO_x$ gases from the burning fuel can be reduced by providing fuel downstream from a main combustion zone.

A prior art method of delivering fuel to the downstream combustion zone of the combustion section is illustrated in U.S. Pat. No. 6,192,688. Fuel is delivered to a location downstream from the main combustion zone by fuel/air injection spokes extending radially into a secondary reaction zone. The fuel/air injection spokes include a plurality of fuel orifices for delivering fuel from a fuel manifold, and include a plurality of air orifices for delivering air from an air manifold. The fuel and air are ignited in the secondary reaction zone by hot products of combustion exiting the primary combustion zone.

Generally, prior art injectors for delivering fuel to downstream combustion zones have required substantial quantities of a diluent, such as air or steam, to be delivered with the fuel to achieve a required cooling of the outer wall of the injector. The delivery of such diluents with the fuel adds to the complexity, with associated costs, of the gas turbine engine. In addition, when air is used as a diluent, the compressor for supplying the air represents an additional parasitic loss that affects the overall plant efficiency.

SUMMARY OF THE INVENTION

In accordance with one aspect of the invention, a fuel nozzle is provided for delivery of fuel to a gas turbine engine. The fuel nozzle comprises a tubular nozzle member comprising an outer nozzle wall defining a longitudinal axis. The nozzle wall includes an inner wall surface and an outer wall surface and has a fuel inlet end and a fuel outlet end. The fuel nozzle further comprises a center body including an outer body surface. The center body has a longitudinal axis that is substantially collinear with the longitudinal axis of the nozzle wall. A gap is defined between the inner wall surface and the outer body surface and extends circumferentially about the outer body surface for providing fuel flow in a longitudinal direction from an upstream end adjacent to the inlet end to a downstream end adjacent to the outlet end. The gap is effective to provide a substantially uniform temperature distribution along the nozzle wall in the circumferential direction.

In accordance with another aspect of the invention, a fuel nozzle is provided for delivery of fuel to a gas turbine engine. The fuel nozzle comprises a tubular nozzle member comprising an outer nozzle wall defining a longitudinal axis. The nozzle wall includes an inner wall surface and an outer wall surface and has a fuel inlet end and a fuel outlet end. The fuel nozzle further comprises a center body including an outer body surface. The center body has a longitudinal axis that is substantially collinear with the longitudinal axis of the nozzle wall. A gap is defined between the inner wall surface and the outer body surface and extends circumferentially about the outer body surface for providing fuel flow in a longitudinal direction from an upstream end adjacent to the inlet end to a downstream end adjacent to the outlet end. A turbulating feature is located adjacent to the gap for causing at least a portion of the fuel flow along the length of the gap to flow transverse to the longitudinal direction. The gap is effective to provide a substantially uniform temperature distribution along the nozzle wall in the circumferential direction.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
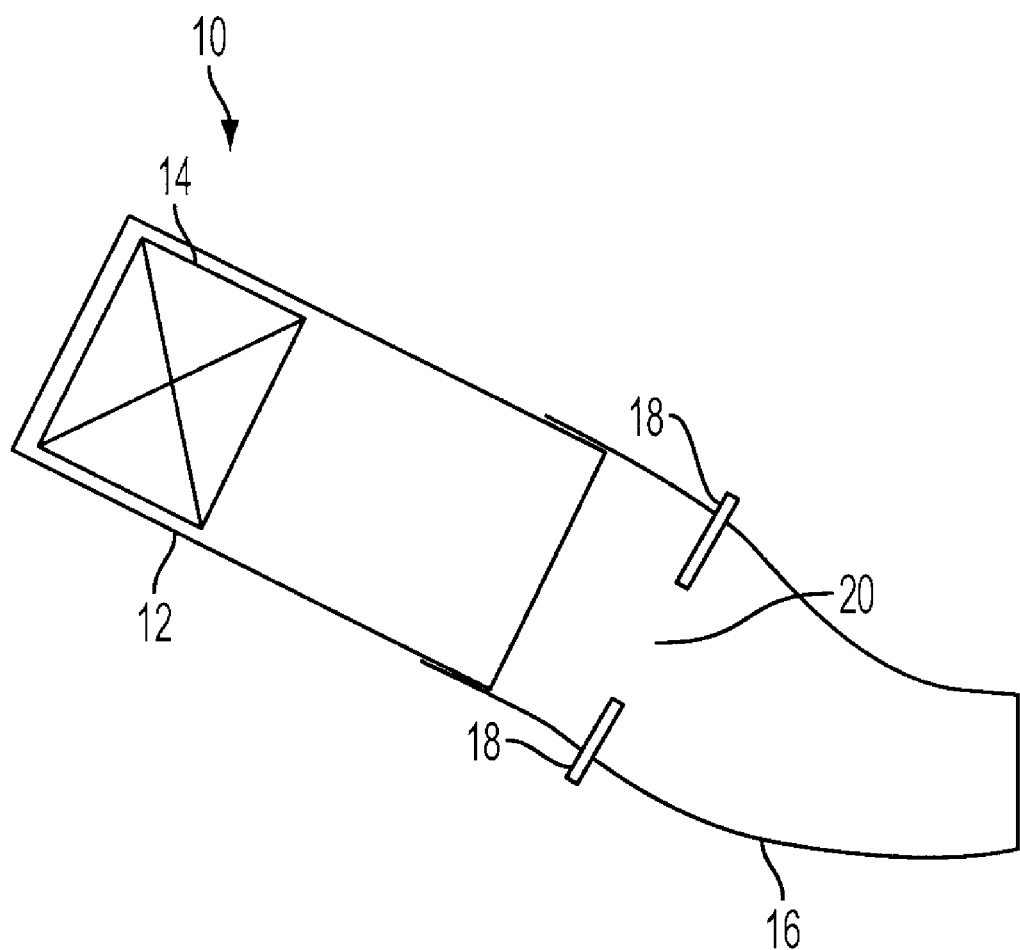
FIG. 1 is a diagrammatic side view of a can type combustor incorporating a fuel nozzle in accordance with the present invention.

Referring to FIG. 1, a can combustor 10 for a gas turbine engine is illustrated including a combustor case 12 and a primary combustor 14. The primary combustor 14 includes structure for receiving air from a compressor section (not shown) of the engine and fuel injectors (not shown) for injecting fuel for combustion within the combustor case 12, as is known in the art. A transition piece 16 is located at an outlet end of the combustor case 12 for receiving hot products of combustion exiting the combustor case 12 and for directing the hot combustion products to a turbine section (not shown) of the engine. Secondary fuel injection nozzles 18 are shown extending radially into a secondary combustion zone 20 defined within the transition piece 16. The nozzles 18 deliver fuel which, in accordance with the system described herein, comprises a gaseous fuel that is ignited by the hot combustion products from the primary combustor 14. Any number of the nozzles 18 may be provided. Further, the nozzles 18, as described in further detail below, may extend to a range of radial locations inside the transition piece 16. Specifically, the nozzles 18 include a cooling feature for cooling an outer wall of the nozzles 18, enabling insertion of the nozzles 18 into the hot gas stream while substantially preventing overheating of the outer wall of the nozzle 18.

Figure 2:
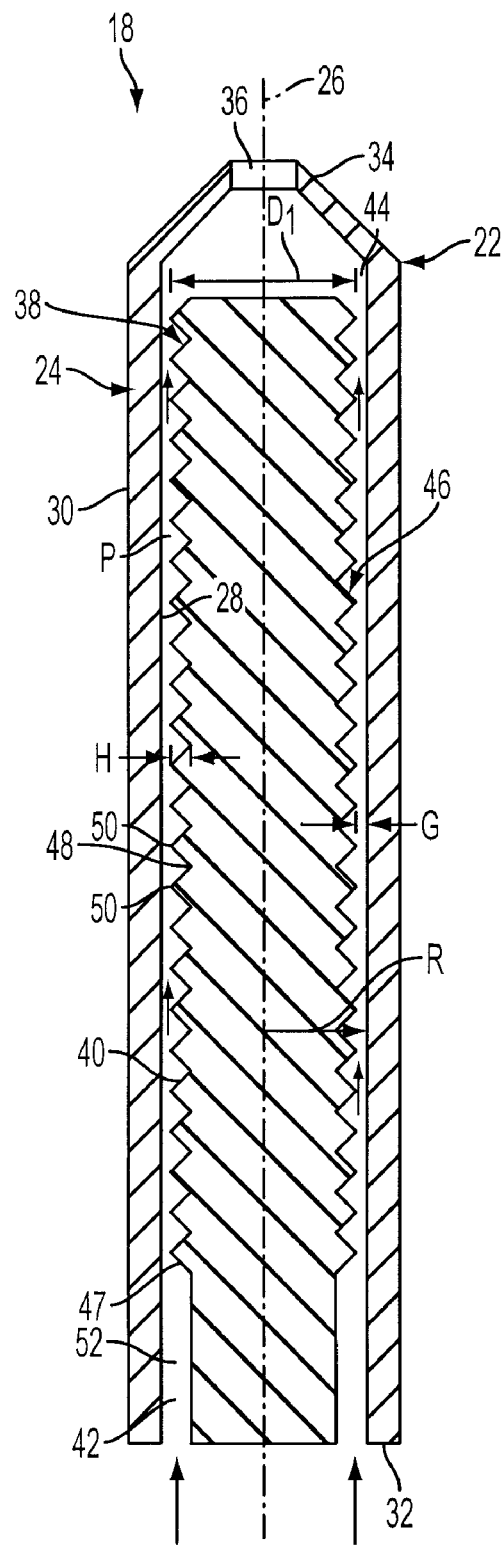
FIG. 2 is a cross-sectional view of a first embodiment of a fuel nozzle in accordance with the present invention.

Referring to FIG. 2, the nozzle 18 comprises a tubular nozzle member 22 comprising an outer nozzle wall 24 defining a longitudinal axis 26. The nozzle member 22 is preferably formed of a material that has a high corrosion resistance at high temperatures. For example, the nozzle member 22 may be formed of a high nickel super alloy, such as Hastelloy® X or Inconel® 625.

The nozzle wall 24 includes an inner wall surface 28 and an outer wall surface 30 and defines a fuel inlet end 32 and a fuel outlet end 34. The nozzle wall 24 may have a wall thickness of approximately 2 mm. The inner wall surface 28 is formed with an inwardly facing cylindrical configuration having a radius of curvature R defined from the longitudinal axis 26. The fuel inlet end 32 may be connected to a fuel source (not shown) for supplying fuel to the nozzle 18. The fuel outlet end 34 includes an outlet aperture 36, and may be formed with a configuration for directing fuel to the outlet aperture 36, such as the tapered end configuration illustrated herein. It should be understood that, within the spirit and scope of the present invention, any number of outlet apertures 36 may be provided, and the fuel outlet end 34 may be formed to any configuration to facilitate dispersal of the fuel into the secondary combustion zone 20.

The nozzle 18 further includes a center body 38 that may be formed of stainless steel and comprises a generally cylindrical outer body surface 40. The center body 38 is formed as a generally solid member within a periphery defined by the outer body surface 40. The center body 38 is supported within the nozzle wall 24 such that a longitudinal axis of the center body 38 is substantially collinear with the longitudinal axis 26 of the nozzle wall 24. The diameter (2R) of the inner wall surface 28 and an outer diameter $D_1$ of the outer body surface 40 are selected such that a circumferentially and longitudinally extending gap G is defined along substantially the length of the center body 38 between the inner wall surface 28 and the outer diameter $D_1$ of the outer body surface 40. Specifically, in the present embodiment and the further embodiments described below, the gap G comprises a space defined between the largest or outer diameter $D_1$ of the center body 38 and the smallest diameter, i.e., twice the radius (2R), of the nozzle wall 24.

The gap G provides a flow path P extending in the longitudinal direction between the nozzle wall 24 and the center body 38 such that fuel may flow from an upstream end 42 of the nozzle 18, adjacent to the inlet end 32, to a downstream end 44 of the nozzle 18, adjacent the outlet end 34. The gap G permits fuel to flow therethrough to effect transfer of heat from the nozzle wall 24 to the fuel, and is effective to provide a substantially uniform temperature distribution along the nozzle wall 24 in the circumferential direction.

To facilitate efficient transfer of heat from the nozzle wall 24 to the fuel as a cooling medium, a turbulating feature is provided along the fuel flow path P to facilitate formation of turbulence within the area of the gap G. In accordance with the embodiment illustrated in FIG. 2, the turbulating feature comprises a spiral configuration 46 defined on the outer body surface 40 and cooperating with a substantially smooth adjacent inner wall surface 28. In particular, the spiral configuration 46 may be any configuration to provide the fuel flow with a flow component in a direction that is transverse to the longitudinal flow direction parallel to the longitudinal axis 26. For example, the spiral configuration 46 may comprise a spiral thread surface including one or more starts, i.e., beginnings of threads indicated at 47, at the upstream end 42 for receiving fuel into one or more helical paths defined within troughs 48 formed between crests 50 of the thread surface. In a preferred embodiment, a plurality of starts and flow paths are provided and, in a most preferred embodiment, four starts and thread paths are formed on the outer body surface 40. Examples of screw thread configurations that may be used to define the crests 50 and troughs 48 include commercially available screw threads such as Torqspline®, Acme or Hi-Lead® screw profiles. The present invention is not limited to the described screw profiles and other screw profiles may be incorporated in the present invention, including custom designed profiles.

Fuel, such as preferably a gaseous fuel, is provided to the starts 47 of the flow paths and to the gap G from a fuel supply region 52 located at the upstream end 42. That is, the fuel supply region 52 comprises an annular area of fuel supplied to the nozzle 18 adjacent to the upstream end 42, and a portion of the fuel may flow directly into the gap G in a longitudinal direction around the circumference of the center body 38, while a portion of the fuel may flow into the starts 47 in a tangential direction relative to the outer body surface 40 to follow a generally spiral or helical flow path. The fuel flow in the spiral configuration 46 interacts with the fuel flow in the gap G forming a substantially non-laminar, swirling flow in the region directly adjacent to the inner wall surface 28. The swirling fuel flow maintains a substantially uniform transfer of heat from the nozzle wall 24 in a circumferential direction at any given longitudinal location along the nozzle 18, resulting in a substantially uniform temperature distribution in the circumferential direction of the nozzle wall 24.

It should be understood that providing a flow through the gap G additionally operates to provide a substantially uniform heat transfer coefficient along the length of the nozzle 18. Further, it may be noted that some heating of the swirling fuel flow occurs as it flows from the inlet end 32 to the outlet end 34, effecting a variation in the temperature distribution along the length of the nozzle wall 24, where the temperature may vary substantially monotonically along the length of the nozzle 18.

The influence of the flow controlled by the spiral configuration 46 relative to the longitudinal flow along the flow path P may be varied by controlling the radial crest to trough height H relative to the radial distance of the gap G. It is believed that turbulated or swirling fuel flow sufficient to effect the heat transfer described herein may be obtained by forming the height H equal to or greater than the radial distance of the gap G, and with the radial distance of the gap G being at least approximately 5% of the radius R of the inner wall surface 28.

It should be noted that in the preferred embodiment, substantially the entire fuel flow entering the nozzle inlet end 32 flows through the flow passage P defined by the gap G and the helical flow passage(s) of the spiral configuration 46. In particular, the interior structure of the center body 38 is formed substantially without through passages extending from the upstream end 42 to the downstream end 44.

Figure 3:
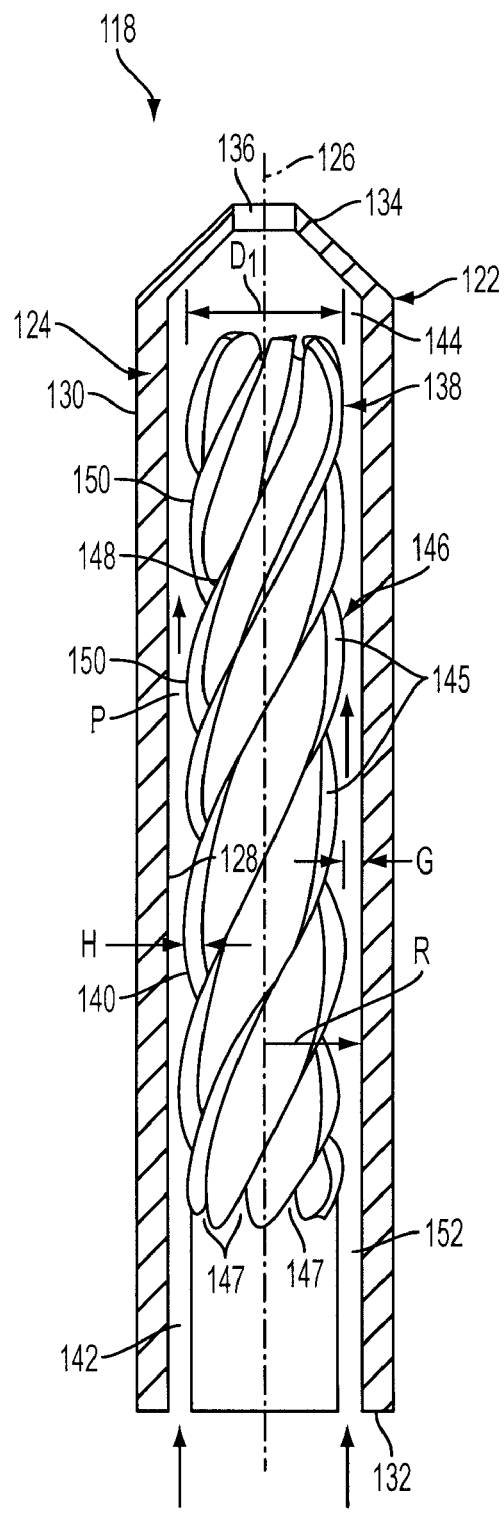
FIG. 3 is a partial cross-sectional view of a second embodiment of a fuel nozzle in accordance with the present invention.

FIG. 3 illustrates an alternative second embodiment of the invention, where elements of the second embodiment corresponding to similar elements of the first embodiment are labeled with the same reference numeral increased by 100. As seen in FIG. 3, the nozzle 118 comprises a tubular nozzle member 122 comprising an outer nozzle wall 124 defining a longitudinal axis 126, and a center body 138 having a longitudinal axis substantially collinear with the longitudinal axis 126 of the nozzle wall 124. The nozzle wall 124 has a configuration that is substantially similar to the nozzle wall 24 described for the embodiment of FIG. 2.

The center body 138 includes a spiral configuration 146 for providing a turbulated or swirling fuel flow in a gap G between the outer surface 140 of the center body 138 and a substantially smooth inner surface 128 of the nozzle wall 124. In particular, the spiral configuration 146 comprises a plurality of flutes 145 defining troughs 148 located between crests 150. The flutes 145 are arranged in a twisted rope configuration and define a plurality of spiral or helical flow paths extending from a plurality of starts 147 located adjacent to the upstream end 142. The flutes 145 define spiral or helical flow paths having a substantially larger pitch than the pitch for the flow paths defined by the thread surface described with reference to FIG. 2. Fuel flow may enter the flow path P from a supply region 152 and either pass directly into the area of the gap G or into the flow paths defined between the flutes 145. As with the embodiment described for FIG. 2, the spiral configuration 146 of FIG. 3 is believed to provide a substantially uniform temperature distribution along the nozzle wall 124 in the circumferential direction, where the radial height H between the crests 150 and troughs 148 is generally equal to or greater than the radial distance of the gap G, and the radial distance of the gap G is at least approximately 5% of the radius R of the inner wall surface 128. Further, the gap G additionally operates to provide a substantially uniform heat transfer coefficient along the length of the nozzle 118.

Figure 4:
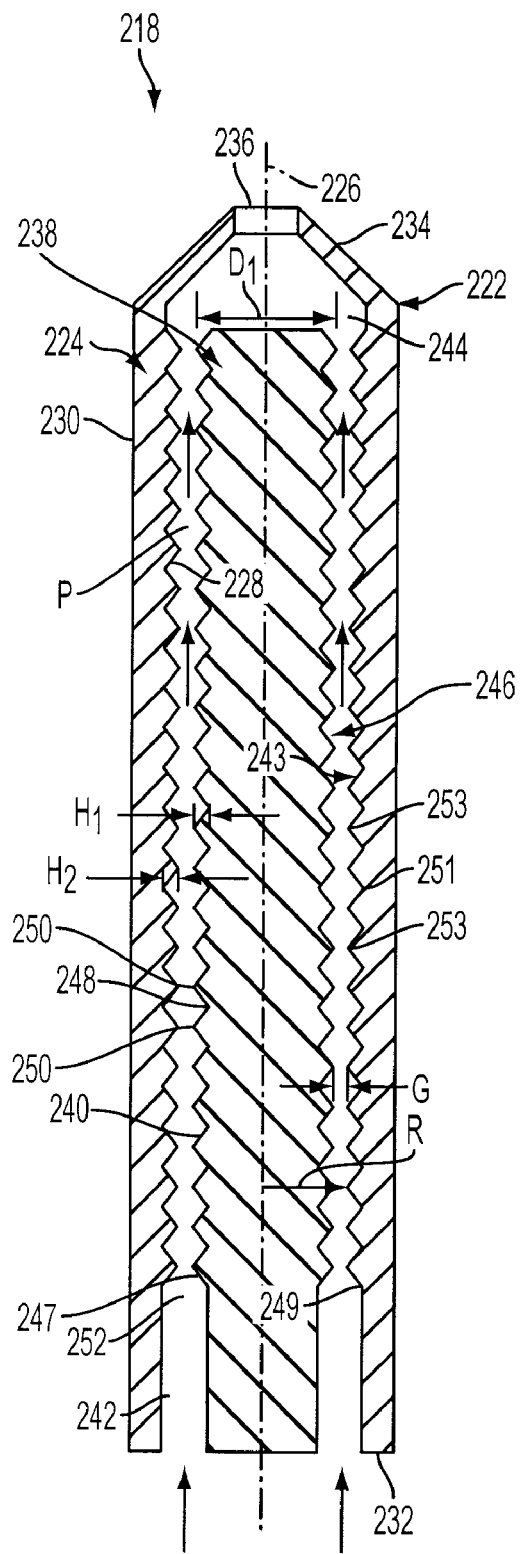
FIG. 4 is a cross-sectional view of a third embodiment of a fuel nozzle in accordance with the present invention.

FIG. 4 illustrates an alternative third embodiment of the invention, where elements of the third embodiment corresponding to similar elements of the first embodiment are labeled with the same reference numeral increased by 200. As seen in FIG. 4, the nozzle 218 comprises a tubular nozzle member 222 comprising an outer nozzle wall 224 defining a longitudinal axis 226, and a center body 238 having a longitudinal axis substantially collinear with the longitudinal axis 226 of the nozzle wall 224.

The center body 238 includes a spiral configuration 246 for providing a turbulated or swirling fuel flow in a gap G between the outer surface 240 of the center body 238 and an inner surface 228 of the nozzle wall 224. In particular, the spiral configuration 246 may be substantially similar to that described for the spiral configuration 46 of FIG. 2, and includes a spiral thread surface including one or more starts 247 at the upstream end 242 for receiving fuel into one or more helical paths defined within troughs 248 formed between crests 250 of the thread surface. The spiral thread surface of the spiral configuration 246 defines a radial crest to trough height $H_1$.

The inner wall surface 228 is similarly formed with a spiral configuration 243 for providing a turbulated or swirling fuel flow in the gap G. The spiral configuration 243 comprises a spiral thread surface including one or more starts 249 at the upstream end 242 for receiving fuel into one or more helical paths defined within troughs 251 formed between crests 253 of the thread surface. The spiral thread surface of the spiral configuration 243 defines a radial crest to trough height $H_2$. The spiral thread surface of the spiral configuration 243 for the nozzle wall 224 may be formed with the same number of starts 249 as the number of starts 247 of the spiral configuration 246 of the center body 238, or the number of starts 249 may be different than the number of starts 247. The spiral threads associated with each of the spiral configurations 243, 246 may be of a type similar to that described for the embodiment of FIG. 2, and each providing turbulating or swirling flow to the fuel flow passing through the flow path P, thereby facilitating transfer of heat from the inner wall surface 228 to the fuel as a cooling medium. The spiral configuration 243, 246 of FIG. 4 is believed to provide a substantially uniform temperature distribution along the nozzle wall 224 in the circumferential direction. Further, the gap G additionally operates to provide a substantially uniform heat transfer coefficient along the length of the nozzle 218.

Figure 5:
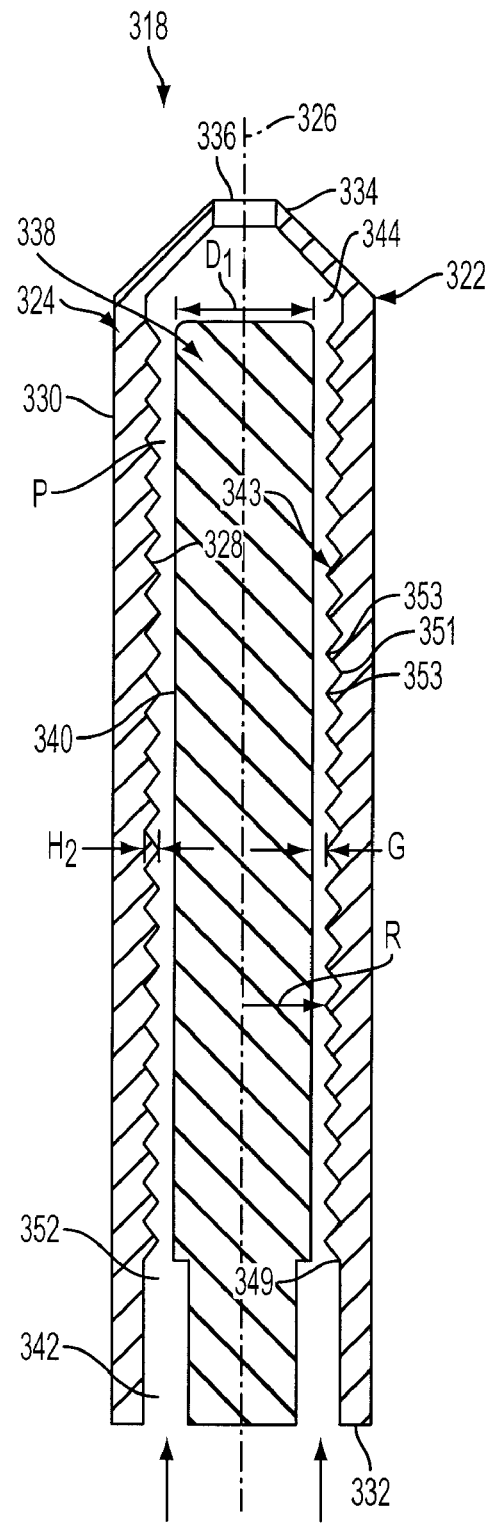
FIG. 5 is a cross-sectional view of a fourth embodiment of a fuel nozzle in accordance with the present invention.

FIG. 5 illustrates an alternative fourth embodiment of the invention, where elements of the fourth embodiment corresponding to similar elements of the first embodiment are labeled with the same reference numeral increased by 300. As seen in FIG. 5, the nozzle 318 comprises a tubular nozzle member 322 comprising an outer nozzle wall 324 defining a longitudinal axis 326, and a center body 338 having a longitudinal axis substantially collinear with the longitudinal axis 326 of the nozzle wall 324.

The center body 338 of the present embodiment comprises a substantially smooth outer body surface 340, and the inner wall surface 328 is formed with a spiral configuration 343 spaced from the outer body surface 340 by a radial gap G. The spiral configuration of the inner wall surface 328 comprises a spiral thread surface including one or more starts 349 at the upstream end 342 for receiving fuel into one or more helical paths defined within troughs 351 formed between crests 353 of the thread surface. The spiral thread surface of the spiral configuration 343 defines a radial crest to trough height $H_2$. The spiral threads associated with the spiral configuration 343 may be of a type similar to that described for the embodiment of FIG. 2, and is configured to provide turbulating or swirling flow to the fuel flow passing through the flow path P, thereby facilitating transfer of heat from the inner wall surface 328 to the fuel as a cooling medium. The spiral configuration 343 of FIG. 3 is believed to provide a substantially uniform temperature distribution along the nozzle wall 324 in the circumferential direction. Further, the gap G additionally operates to provide a substantially uniform heat transfer coefficient along the length of the nozzle 318.

It should be understood that although the fuel flow is described in the above embodiments as flowing within flow paths defined within the troughs between crests or flutes forming the spiral configuration, the spiral or helical flow of fuel may mix with the longitudinal flow of fuel passing through the gap G to form a swirling flow within the gap G. Further, some fuel flow will also pass from the area of the gap G into the spiral or helical flow paths defined by the spiral configurations. The spiral configurations for each of the described embodiments create a circumferentially circulating flow of fuel, where the fuel operates as a cooling medium as it passes to the outlet end of the nozzle.

It additionally should be noted that it is desirable to provide the gap along substantially the entire length of the center body in that the gap ensures that the fuel may come in contact with substantially the entire length of the outer nozzle wall. In particular, by maintaining the center body out of contact with the inner nozzle wall surface and permitting the circumferentially circulating fluid flow through the areas defined by the gap, a substantially uniform temperature distribution may be maintained along the nozzle wall in the circumferential direction.

The described configuration for the fuel nozzle 18 of the present invention is believed to provide a reduction in the nozzle wall temperature of up to approximately 200° C.-300° C. relative to the temperature of the hot combustion products in the secondary combustion zone 20. Hence, the additional cooling capacity provided to the outer nozzle wall facilitates increasing the depth to which the nozzle 18 of the present invention may be inserted radially into the interior of the transition piece 16 without exceeding the temperature limit of the material forming the nozzle outer wall.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fuel nozzle for delivery of fuel to a gas turbine engine, the fuel nozzle comprising:
a tubular nozzle member comprising an outer nozzle wall defining a longitudinal axis, the nozzle wall including an inner wall surface and an outer wall surface and having a fuel inlet end and a fuel outlet end;
a center body including an outer body surface, the center body having a longitudinal axis that is substantially collinear with the longitudinal axis of the nozzle wall;
a gap defined between the inner wall surface and the outer body surface and extending circumferentially about the outer body surface for providing fuel flow in a longitudinal direction from an upstream end adjacent the inlet end to a downstream end adjacent the outlet end, wherein at least a portion of the fuel flow in the gap flows in the longitudinal direction substantially parallel to the longitudinal axes of the wall surface and the nozzle wall, and
a turbulating feature on at least one of the inner wall surface and the outer body surface comprising a spiral configuration extending between the upstream end and the downstream end for causing at least a portion of the fuel flow in the gap to flow transverse to the longitudinal direction, the upstream end including a plurality of starts for supplying fuel to a plurality of flow paths defined on the spiral configuration, and the gap being effective to provide a substantially uniform temperature distribution along the nozzle wall in the circumferential direction.

2. The fuel nozzle as in claim 1, wherein the spiral configuration is formed on one of the inner wall surface and the outer body surface, and the other of the inner wall surface and the outer body surface comprises a substantially smooth surface located in spaced relation to the spiral configuration to define the gap.

3. The fuel nozzle as in claim 2, wherein the spiral configuration comprises a spiral thread surface.

4. The fuel nozzle as in claim 2, wherein the spiral configuration comprises a twisted rope configuration formed on the outer body surface.

5. The fuel nozzle as in claim 1, wherein each of the inner wall surface and outer body surface includes the spiral configuration and the spiral configuration comprises a spiral thread surface, the spiral thread surfaces being located in spaced relation to define the gap.

6. The fuel nozzle as in claim 1, wherein the upstream end includes four starts for supplying fuel to four flow paths.

7. The fuel nozzle as in claim 1, wherein the center body prevents fluid flow between the upstream end and the downstream end within an area circumscribed by the outer body surface.

8. The fuel nozzle as in claim 1, wherein the spiral configuration is defined by circumferentially and longitudinally extending crest and trough portions, the radial distance between the top of a crest and the bottom of a trough comprising a distance equal to or greater than the radial distance of the gap from the top of a crest to the inner wall surface.

9. The fuel nozzle as in claim 1, wherein the radial distance of the gap is at least approximately 5% of the radius of the inner wall surface.

10. The fuel nozzle as in claim 1, wherein the gap is effective to provide a substantially uniform heat transfer coefficient along the length of the nozzle.

11. In a gas turbine engine, a gas turbine engine fuel nozzle for delivery of fuel to a gas turbine engine, the fuel nozzle comprising:
a tubular nozzle member extending radially into a combustion zone of the gas turbine engine transverse to a flow of hot combustion products through the combustion zone, the nozzle member comprising an outer nozzle wall defining a longitudinal axis, the nozzle wall including an inner wall surface and an outer wall surface and having a fuel inlet end and a fuel outlet end;
a center body including an outer body surface, the center body having a longitudinal axis that is substantially collinear with the longitudinal axis of the nozzle wall;
a gap defined between the inner wall surface and the outer body surface and extending circumferentially about the outer body surface for providing fuel flow in a longitudinal direction from an upstream end adjacent the inlet end to a downstream end adjacent the outlet end; and
a turbulating feature located adjacent to the gap on at least one of the inner wall surface and the outer body surface comprising a spiral configuration extending between the upstream end and the downstream end for causing at least a portion of the fuel flow along the length of the gap to flow transverse to the longitudinal direction in a portion of the nozzle member located within the combustion zone, the upstream end including a plurality of starts for supplying fuel to a plurality of flow paths defined on the spiral configuration, and the gap being effective to provide a substantially uniform temperature distribution along the nozzle wall in the circumferential direction.

12. The fuel nozzle as in claim 11, wherein the turbulating feature comprises a spiral configuration extending between the upstream end and the downstream end, the spiral configuration effective to cause the fuel flow to circulate circumferentially along substantially the length of the center body.

13. The fuel nozzle as in claim 12, wherein the center body is spaced out of contact with the nozzle wall along substantially the length of the center body.

14. The fuel nozzle as in claim 13, wherein the spiral configuration is defined by circumferentially and longitudinally extending crest and trough portions defining a screw thread surface.

15. The fuel nozzle as in claim 14, wherein the radial distance between the top of a crest and the bottom of a trough comprises a distance equal to or greater than the radial distance of the gap from the top of a crest to the inner wall surface.

16. The fuel nozzle as in claim 15, wherein the radial distance of the gap is at least approximately 5% of the radius of the inner wall surface.

17. The fuel nozzle as in claim 12, wherein the upstream end includes a plurality of starts for supplying fuel to a plurality of flow paths defined on the spiral configuration.

* * * * *